March 29, 1938.  R. L. HIBBARD  2,112,240
SELF CENTERING DEVICE
Filed April 2, 1937  3 Sheets-Sheet 1

INVENTOR.
ROBERT L. HIBBARD
BY James C. Bradley
ATTORNEY.

March 29, 1938.　　　R. L. HIBBARD　　　2,112,240
SELF CENTERING DEVICE
Filed April 2, 1937　　　3 Sheets-Sheet 2

INVENTOR.
ROBERT L. HIBBARD
BY James C. Bradley
ATTORNEY.

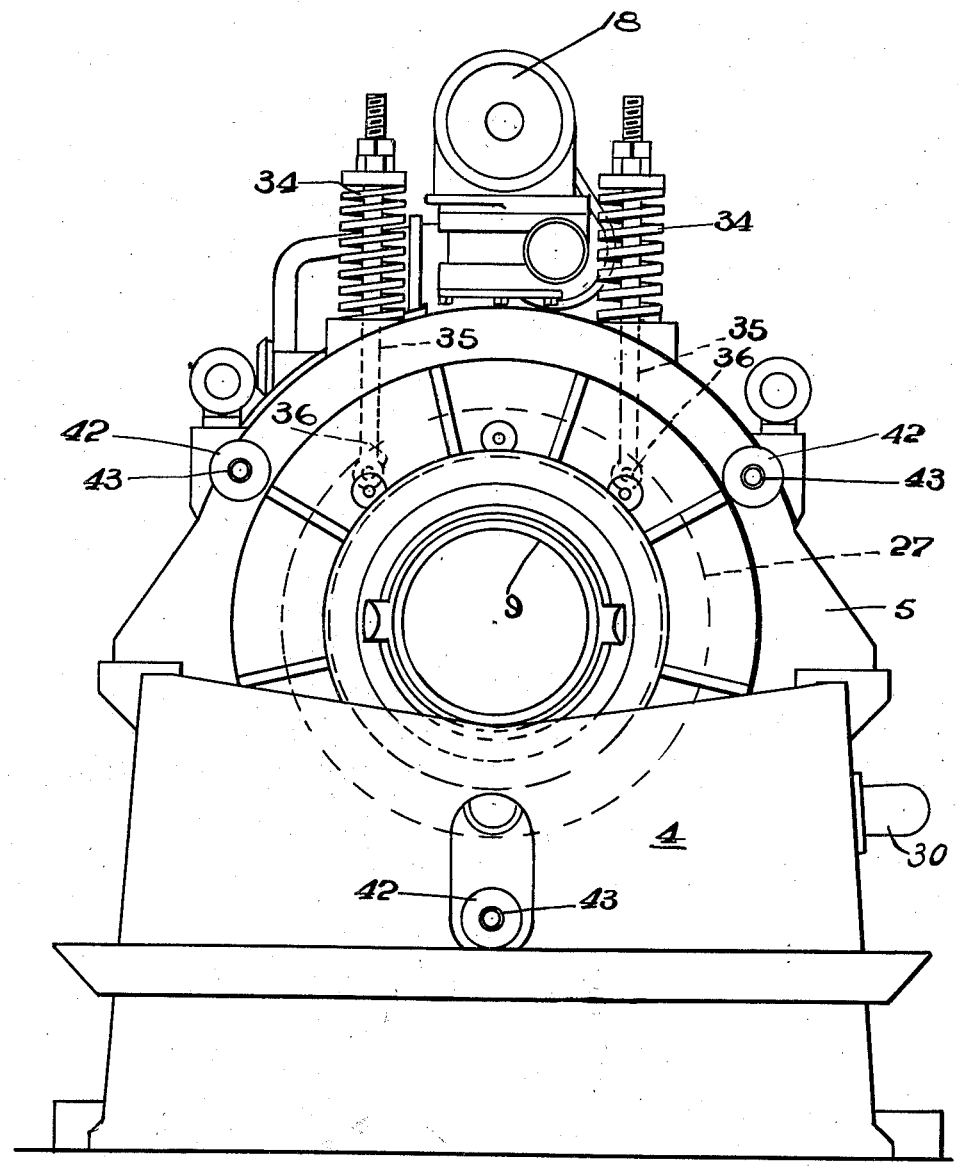

Patented Mar. 29, 1938

2,112,240

UNITED STATES PATENT OFFICE 2,112,240

SELF-CENTERING DEVICE

Robert L. Hibbard, Pittsburgh, Pa., assignor of one-half to William K. Stamets, Pittsburgh, Pa.

Application April 2, 1937, Serial No. 134,623

11 Claims. (Cl. 10—107)

Figure 1:
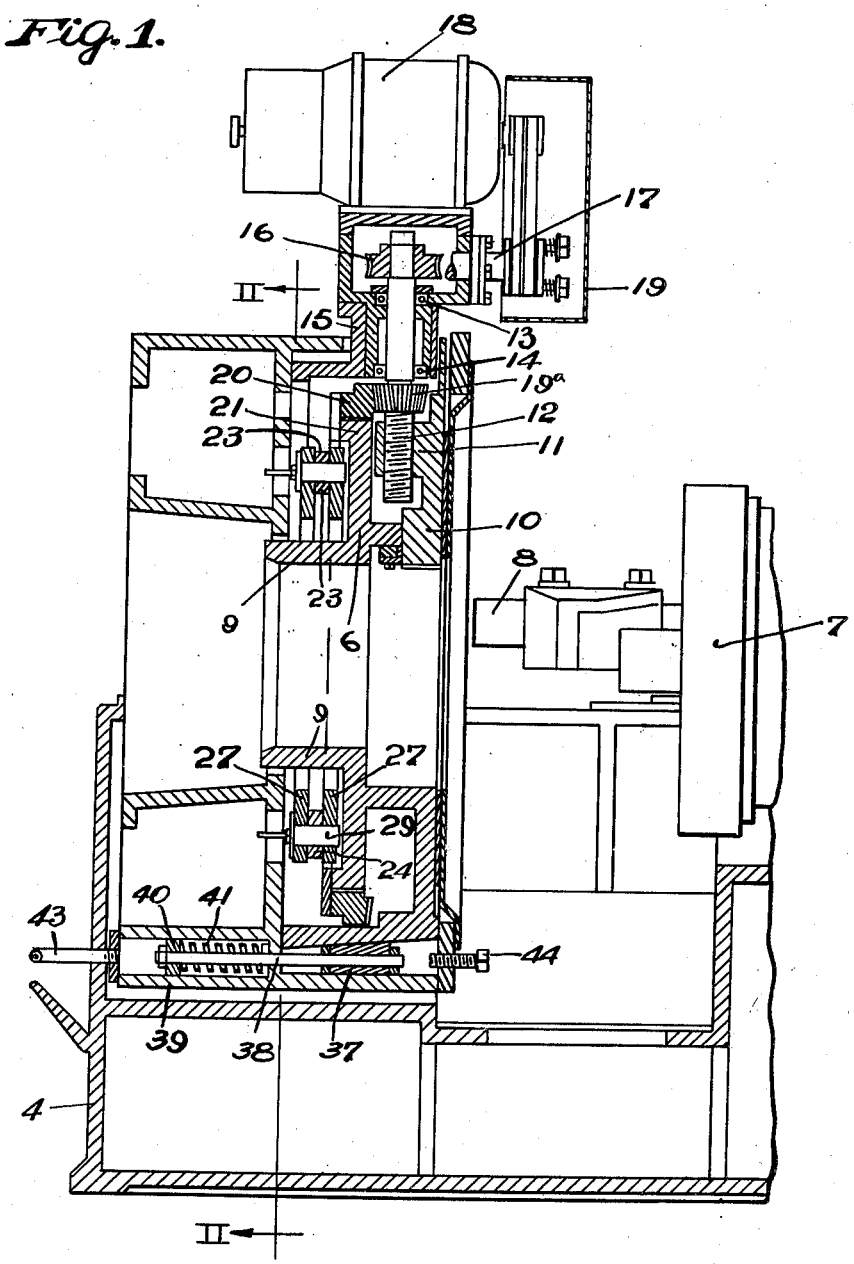
Figure 2:
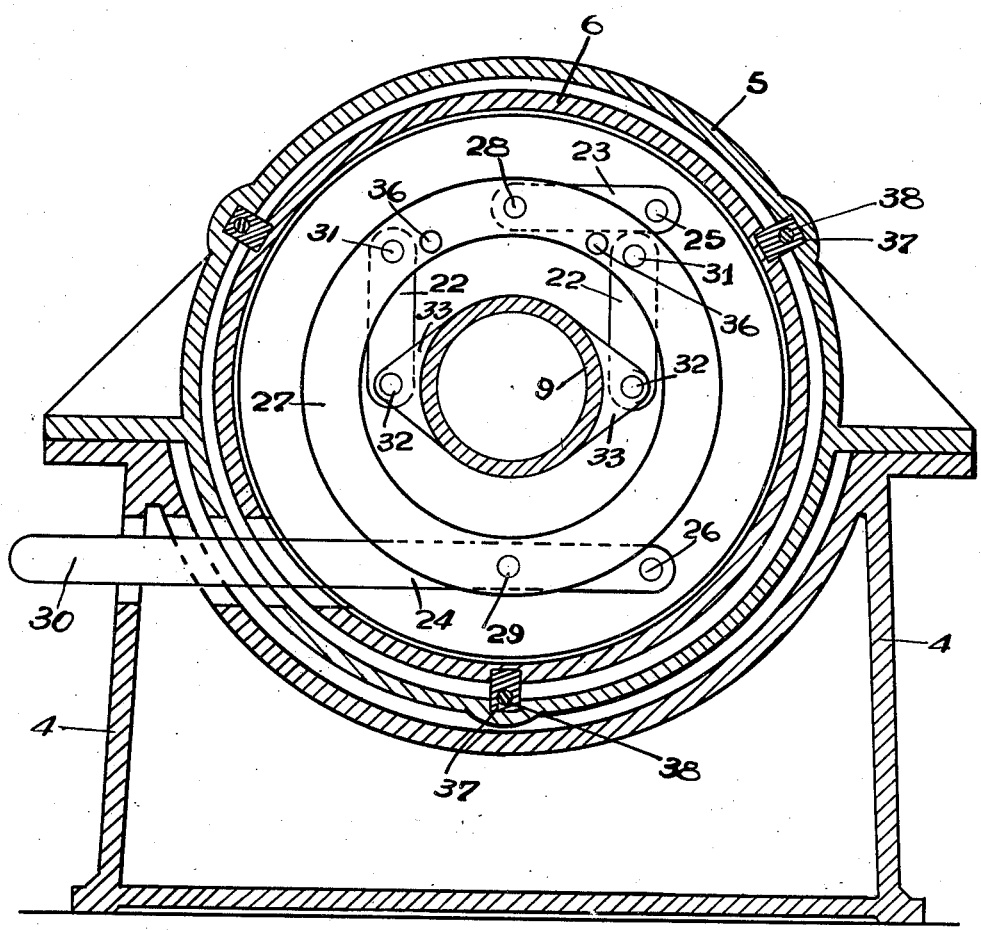

The invention relates to a floating or self-centering holder for use in connection with threading or other machine tool operations. It is designed to carry either the clamp for holding the blank to be machined or the tool or dies which operate upon the work. The device is similar in function and general construction to that of my Patent No. 1,967,507, dated July 24, 1936, but constitutes an improvement thereover. Such improvement consists in the addition of securing means which may be employed to anchor or fix the floating member of the holder after it has assumed a properly centered position due to the coaction of the work and cutting tool. The fixing or anchoring of the floating member, at such time, tends to prevent chattering and vibrating and results in better cutting action by the tool and longer life thereof. Specifically the anchoring or fixing of the floating member is accomplished by a plurality of wedges which coact between the floating member and the fixed support surrounding the holder, such wedges being moved to locking position by spring means under the control of the operator. The wedges are moved to reverse position by fluid operated means, such as plungers working in cylinders. A further improvement consists in the provision of stop means cooperating with the wedges whereby they may all be positioned so as to fix the floating holder member with its center line coincident with the center line of the machine, thus causing the chuck or holder to function without floating in the same manner as the conventional chuck or holder. One embodiment of the invention is illustrated in the accompanying drawings, wherein:

Figure 1 is a vertical section through the holder and the cooperating parts in a coupling threading set up. Fig. 2 is a section on the line II—II of Fig. 1. And Fig. 3 is a front elevation.

Referring to the drawings, 4 is the framework or base of the machine, 5 is the chuck housing secured to the base and enclosing the chuck; 6 is the chuck frame mounted for floating movement, as later described and carrying the clamping jaws; 7 is a head mounted for rotation on the carriage of the machine and provided with the threading tool 8 adapted to engage the blank, such as a coupling, which is clamped in the jaws of the chuck. In operation, the rotating head is advanced so that its tool threads the blank carried in the chuck.

The chuck frame 6 is provided with a sleeve 9 at its center, and carries three chuck jaws 10, one of which is shown in Fig. 1, mounted for radial movement. The jaws have threaded lugs 11 engaged by threaded shafts 12, by whose rotation the jaws are moved in and out. The shaft 12 at the upper side of the frame is swivelled in bearings 13 and 14 in a frame 15 which is supported on the chuck frame. The shaft is provided with a worm wheel 16 driven by a worm on the shaft 17, and such shaft 17 is driven from a motor 18 mounted on the frame 15 through gearing in the casing 19. The shaft 12 also carries a bevel pinion 19a meshing with a ring gear 20 mounted on a collar 21 forming part of the chuck frame 6. The other two shafts 12, 12 (not shown), which move the other chuck jaws in and out, mesh with the ring gear 20, so that the rotation of the drive shaft 12 from the motor 18 causes the movement of all of the jaws in and out to tighten and loosen them with respect to the blank. The operating means for chuck jaws is one which is well known in the art, and, therefore, requires no further description in matters of detail.

The means for supporting the chuck frame so that it floats is preferably similar to that shown in my patent, heretofore referred to, and involves the use of the two sets of links 22, 22 and 23, 24 shown in Fig. 2. The horizontal links 23 and 24 are pivoted to the chuck housing 5 by means of the bolts 25 and 26 at their right hand ends, and at their other ends, are pivoted to a floating ring or frame 27 made up of the two annular bands spaced apart, as indicated in Fig. 1, the pins 28 and 29 being employed to connect the parts. The link 24 is extended to the left past its pivot pin 29 to provide a handle 30 projecting through the wall of the housing 5, so that the chuck frame may be easily positioned by the operator when the machining operation on the blank begins.

The chuck frame is supported from the ring 27 by means of the links 22, 22 which are connected to the ring at their upper ends by the pins 31, 31 and at their lower ends are pivoted by the pins 32, 32 to lugs 33, 33 projecting from the sides of the sleeve 9 and integral therewith. In order to yieldingly support the chuck frame in approximately central position with respect to the axis of rotation of the tool, a pair of coil springs 34, 34 (Fig. 3) are provided, such springs being mounted on the chuck housing. These springs support the rods 35, 35 which are connected at their lower ends to the pins 36, 36 (Figs. 2 and 3) mounted in the ring.

The construction, to which the invention particularly relates, is the means for locking the self centering chuck frame, as above described, in the position which it assumes due to the co-action between the threading tool and the blank carried by the chuck jaws. This means comprises a set of three wedges 37, 37, 37 at spaced intervals around the periphery of the chuck frame fitting in tapering recesses in the opposing surfaces of the chuck frame 6 and housing 5. The wedges are each carried by a rod 38 (Fig. 1), to which it is pinned, and has its outer end in a cylinder 39 formed in the chuck housing. The end of the rod carries a plunger 40, and is normally pushed to the left to tighten the wedge by means of a coil spring 41. The outer ends of the cylinders are closed by cover plates 42 perforated and threaded, as indicated, for the attachment of pipe connections 43 leading to a suitable fluid pressure supply, so that by the actuation of a suitable valve, air or other fluid under pressure may be admitted and released to move the wedges to release position or to permit the springs 41 to move the wedges to locking position. At the beginning of a threading operation, air is admitted to the cylinders moving the wedges to the right (Fig. 1) so that the chuck frame is free to adjust itself, and is centered with respect to the axis of rotation of the threading tool. When this adjustment has occurred, the fluid pressure is released from the cylinders, permitting the springs 41 to move the wedges to the left to locking position, as shown. The chuck frame is thus held in fixed position during the remainder of the threading operation, and the cutting action of the tool is better than would otherwise be the case in the use of a floating chuck.

In some cases, it may be desirable to center the chuck frame, so that its center line is co-incident with the axis of rotation of the tool, and to lock it in such position, so that the floating feature is eliminated. In such case, this result is secured by the use of the stop screws 44 which are screwed in till their heads come up against the cover plate 45. The length of the stop screws is such that in this screwed-in position, their ends engage the ends of the rods 38 and hold the wedges tight in their tapered recesses. Under this condition, the chuck frame 9 is held against movement and functions in the same manner as the conventional non-floating chuck frame.

The work-engaging means, as exemplified by the jaws 10, may be variously constructed to meet requirements, the term "work-engaging means" as used in the claims being inclusive of dies or other cutting tools when the work comprises a pipe or rod which is to be threaded exteriorly. While the locking means preferably employed are the wedge means, as heretofore described, the invention is not limited to the use of such wedge means as other means might be substituted for clamping or locking the work-engaging means in the position to which it is adjusted.

What I claim is:

1. In combination in a self centering device of the character specified, a fixed support, a frame mounted for floating movement transversely of the support, a second frame mounted on the first frame for floating movement transversely of the line of movement of such first frame, work-engaging means carried by the second frame, locking means movable relatively to the second frame and cooperating therewith and with the fixed support to lock such second frame in any position to which it may be moved, and means for moving the locking means.

2. In combination in a self centering device of the character specified, a fixed support, a frame mounted for floating movement transversely of the support, a second frame mounted on the first frame for floating movement transversely of the line of movement of such first frame, work engaging means carried by the second frame, wedge means movable relative to the second frame and cooperating therewith and with the fixed support to lock such second frame in any position to which it may be moved, and means for moving the wedge means.

3. In combination in a self centering device of the character specified, a fixed support, a frame mounted for floating movement transversely of the support, a second frame mounted on the first frame for floating movement transversely of the line of movement of such first frame, work engaging means carried by the second frame, a plurality of wedge members at spaced intervals around the second frame movable relative thereto and cooperating therewith and with the fixed support to lock such second frame to any position to which it may be moved, and means for moving the wedge members simultaneously to locking position.

4. In combination in a self centering device of the character specified, a fixed support, a frame mounted for floating movement transversely of the support, a second frame mounted on the first frame for floating movement transversely of the line of movement of such first frame, work engaging means carried by the second frame, a plurality of wedge members at spaced intervals around the second frame movable relative thereto and cooperating therewith and with the fixed support to lock such second frame to any position to which it may be moved, fluid pressure means for moving the wedge members to release position, and spring means for moving the wedge members to locking position.

5. In combination in a self centering device of the character specified, a fixed support, a frame mounted for floating movement transversely of the support, a second frame mounted on the first frame for floating movement transversely of the line of movement of such first frame, work engaging means carried by the second frame, wedge means movable relative to the second frame and cooperating therewith and with the fixed support to lock such second frame in any position to which it may be moved, means for moving the wedge means, and releasable stop means for holding the wedge means in fixed position with the second frame centered with respect to the fixed support.

6. In combination in a self centering device of the character specified, a fixed support, a frame on the support having a parallel link connection thereto, a second frame carried by the first frame having a parallel link connection thereto so that it is guided in a line substantially at right angles to the line of movement of the first frame, work engaging means carried by the second frame, locking means movable relative to the second frame and cooperating therewith and the fixed support to lock such second frame in any position to which it may be moved, and means for moving the locking means.

7. In combination in a self centering device of the character specified, a fixed support, a frame on the support having a parallel link connection thereto, a second frame carried by the first frame having a parallel link connection thereto so that it is guided in a line substantially at right angles to the line of movement of the first frame, work engaging means carried by the second frame, a plurality of wedge members at spaced intervals around the second frame movable relative thereto and cooperating therewith and the fixed support to lock such second frame in any position to which it may be moved, and means for moving the wedge members simultaneously to locking position.

8. In combination in a self centering device of the character specified, a fixed support, a frame on the support having a parallel link connection thereto, a second frame carried by the first frame having a parallel link connection thereto so that it is guided in a line substantially at right angles to the line of movement of the first frame, work engaging means carried by the second frame, wedge means movable relative to the second frame and cooperating therewith and the fixed support to lock such second frame in any position to which it may be moved, fluid pressure operating means for moving the wedge means to release position, and spring means for moving the wedge means to locking position when fluid pressure is released from said operating means.

9. In combination in a self centering device of the character specified, a fixed support, a frame on the support having a parallel link connection thereto, a second frame carried by the first frame having a parallel link connection thereto so that it is guided in a line substantially at right angles to the line of movement of the first frame, work engaging means carried by the second frame, a plurality of wedge members at spaced intervals around the second frame movable relative thereto and cooperating therewith and the fixed support to lock such second frame in any position to which it may be moved, fluid operated means for moving the wedge members to release position, and spring means for moving the wedge members in the reverse direction.

10. In combination in a self centering device of the character specified, a fixed support, a frame on the support having a parallel link connection thereto, a second frame carried by the first frame having a parallel link connection thereto so that it is guided in a line substantially at right angles to the line of movement of the first frame, work engaging means carried by the second frame, wedge means movable relative to the second frame and cooperating therewith and the fixed support to lock such second frame in any position to which it may be moved, means for moving the wedge means, and releasable stop means for holding the wedge means in fixed position with the center line of the second frame on center with the axis of rotation of the machine on which the centering device is applied.

11. In combination in a self centering device of the character specified, a fixed support, a frame on the support having a parallel link connection thereto, a second frame carried by the first frame having a parallel link connection thereto so that it is guided in a line substantially at right angles to the line of movement of the first frame, work engaging means carried by the second frame, a plurality of wedge members at spaced intervals around the second frame movable relative thereto and cooperating therewith and the fixed support to lock such second frame in any position to which it may be moved, means for moving the wedge members simultaneously to locking position, and releasable stop means for fixing the location of all of the wedge members in the same relative position so as to hold the second frame centered with respect to the machine on which the device is applied.

ROBERT L. HIBBARD.